(12) United States Patent
Sledd et al.

(10) Patent No.: US 10,306,877 B2
(45) Date of Patent: Jun. 4, 2019

(54) REMOVABLE INSERT FOR A HORSESHOE

(71) Applicant: FOUR SCORNED, LLC, Paris, KY (US)

(72) Inventors: Kenney C. Sledd, Paris, KY (US); Mark A. Taulbee, Lexington, KY (US)

(73) Assignee: FOUR SCORNED, LLC, Paris, KY (US)

( * ) Notice: Subject to any disclaimer, the term of this patent is extended or adjusted under 35 U.S.C. 154(b) by 0 days.

(21) Appl. No.: 15/409,882

(22) Filed: Jan. 19, 2017

(65) Prior Publication Data
US 2017/0127661 A1 May 11, 2017

Related U.S. Application Data

(63) Continuation-in-part of application No. 13/667,433, filed on Nov. 2, 2012, now Pat. No. 9,572,336.
(60) Provisional application No. 61/555,080, filed on Nov. 3, 2011.

(51) Int. Cl.
A01L 1/04 (2006.01)

(52) U.S. Cl.
CPC ...................... A01L 1/04 (2013.01)

(58) Field of Classification Search
CPC ................. A01L 1/00; A01L 1/04; A01L 7/04
See application file for complete search history.

(56) References Cited

U.S. PATENT DOCUMENTS

| 189,692 | A | * | 4/1877 | Brightman | A01L 7/04 168/35 |
|---|---|---|---|---|---|
| 292,302 | A | * | 1/1884 | Hall | A01L 7/06 168/42 |
| 860,453 | A | | 7/1907 | Dunlap | |
| 1,187,332 | A | * | 6/1916 | Keller | A01L 7/04 168/31 |
| 1,361,744 | A | * | 12/1920 | Porter | A01L 7/04 168/41 |
| 1,458,527 | A | * | 6/1923 | Dinkelacker | A01L 7/04 168/33 |
| 1,458,648 | A | * | 6/1923 | Freeman | A01L 7/04 168/41 |
| 1,520,884 | A | * | 12/1924 | Pitcher | A01L 7/04 168/41 |
| 3,050,133 | A | | 8/1962 | Ketner et al. | |
| 3,460,627 | A | * | 8/1969 | Teixeira | A01L 7/04 168/24 |
| 3,476,190 | A | * | 11/1969 | Jenny | A01L 5/00 168/24 |

(Continued)

FOREIGN PATENT DOCUMENTS

| EP | 0280656 B1 | 2/1992 |
| WO | WO2010102633 A1 | 9/2010 |

OTHER PUBLICATIONS

English machine translation of EP0280656.

Primary Examiner — Michael H Wang
(74) Attorney, Agent, or Firm — King & Schickli, PLLC

(57) ABSTRACT

A substantially u-shaped horseshoe connected to a hoof of a horse adaptable for use on different surfaces without removing the horseshoe from the horse. The horseshoe has a cavity formed within a center of the closed portion of the u-shaped horseshoe. The horseshoe further has a removable insert having a toe grab configured to be positioned within the cavity.

19 Claims, 13 Drawing Sheets

(56) References Cited

U.S. PATENT DOCUMENTS

| | | | | |
|---|---|---|---|---|
| 3,970,149 | A * | 7/1976 | Featherstone | A01L 1/00 168/25 |
| 4,122,900 | A * | 10/1978 | Barr | A01L 7/06 168/12 |
| 4,139,061 | A * | 2/1979 | Vogel, Jr. | A01L 7/04 168/41 |
| 5,027,904 | A * | 7/1991 | Miller | A01L 7/04 168/33 |
| 5,105,891 | A * | 4/1992 | Noffsinger | A01L 7/02 168/13 |
| 5,205,362 | A * | 4/1993 | Noffsinger | A01L 5/00 168/13 |
| 5,213,163 | A * | 5/1993 | Schaffer | A01L 3/02 168/4 |
| 5,560,428 | A * | 10/1996 | Inglin | A01L 7/02 168/11 |
| 5,740,865 | A * | 4/1998 | Turk | A01L 1/04 168/4 |
| 6,076,607 | A | 6/2000 | Bergeleen | |
| 6,082,462 | A * | 7/2000 | Lyden | A01L 5/00 168/24 |
| 6,401,828 | B1 * | 6/2002 | Rafeld | A01L 5/00 168/12 |
| 6,779,609 | B2 * | 8/2004 | Forstner | A01L 3/00 168/4 |
| 7,624,811 | B2 * | 12/2009 | Coloumbe | A01L 1/02 168/23 |
| 7,717,186 | B2 | 5/2010 | Daine | |
| 7,793,734 | B2 | 9/2010 | Burns | |
| 2007/0007017 | A1 * | 1/2007 | Burns | A01L 5/00 168/4 |
| 2009/0120650 | A1 | 5/2009 | Daine | |
| 2012/0118587 | A1 * | 5/2012 | Patek | A01K 13/007 168/4 |

* cited by examiner

REMOVABLE INSERT FOR A HORSESHOE

This application is a continuation-in-part of U.S. patent application Ser. No. 13/667,433, filed on Nov. 2, 2012, which claims the benefit of U.S. Provisional Patent Application Ser. No. 61/555,080, filed Nov. 3, 2011, the disclosure of which is incorporated herein by reference.

TECHNICAL FIELD

This disclosure relates to horseshoes for use with the hoof of various equine breeds and, more particularly, to a horseshoe having an insert for use in training and racing thoroughbred horses as well as on other breeds of horses for other types of equine competitions.

BACKGROUND

A horseshoe is a fabricated U-shaped plate attached to the bottom of a horse's hoof to provide greater traction. Depending on the type of work the horse is performing, horseshoes can protect the horse's hoof as well as the horse's muscles, bones and tendons from injury. Generally, a horseshoe is made out of metal, but they are available in a variety of materials and styles depending on their particular purpose or a horse's specific need. The horseshoe is typically nailed through the insensitive hoof wall, but may also be attached to the hoof via an adhesive. This tedious task is usually performed by a farrier (or blacksmith), who specializes in the preparation of feet, assessing potential lameness issues and fitting appropriate shoes.

Although horseshoes are used on a number of different breeds of horses, horseshoes are most commonly associated with thoroughbred horses, which are bred mainly for racing. As noted above, in addition to protection, horseshoes are often used to provide better traction for a horse, particularly a thoroughbred in racing or training conditions. Thoroughbred horses race, train and exercise on a number of different surfaces, such as dirt, grass and synthetic surfaces. Furthermore, thoroughbred horses race, train and exercise in different weather and track conditions, such as fast, firm, wet and muddy. The type of horseshoes that may be used in thoroughbred racing, especially in the United States is heavily regulated. For example, various types of traction devices, such as toe grabs, bends, caulks, studs, stickers and toe clips that may be used on horseshoes for horses in thoroughbred racing may be expressly prohibited or required to meet certain standards, such as limited to a particular height.

The particular surface and track condition as well as the individual horse's characteristics often dictate the type of horseshoe that will be used. For example, a plain horseshoe may be used in benign racing conditions, i.e., on a fast dirt track. On the other hand, a horseshoe may have a toe grab that extends downwardly at the toe of the horseshoe to provide additional traction for a horse in non-ideal track conditions. Of course, it should be appreciated that horseshoes come in a variety of different styles, such as corrective bar shoes and shoes with one of more calks or projections. Importantly, the various styles of horseshoes are typically manufactured in the condition for which they are used by the farrier, i.e., you cannot convert a plain horseshoe into a horseshoe having a toe grab without removing the first shoe from the horse's hoof and re-shodding the horse with a second shoe.

Depending on the horse's need for its training or racing schedule, a farrier in consultation with the horse's owner and trainer selects the desired shoe and fastens it to the horse's hoof. If the training or racing conditions change or the horse needs a different type of shoe for any reason, i.e., it needs a shoe with a toe grab rather than a plain shoe, the farrier must remove the original horseshoe and replace it (a process known as re-shodding), which can be a rigorous, time-consuming and expensive process. As discussed above, since the toe grab is soldered onto the horseshoe by the manufacturer of the horseshoe, the farrier must replace the entire shoe if a horse needs a horseshoe with a toe grab rather than a plain horseshoe.

Although re-shodding is often necessary, it creates a number of undesirable consequences. For example, re-shodding can be a time-consuming process to remove the old shoes and replace them with the new shoes and shoe changes are often demanded under strict time constraints, i.e., shortly before a race. Furthermore, there is an additional expense for the horse owner because a farrier must be paid to re-shod the horse. Finally, and perhaps most importantly, re-shodding increases the risk of injury to the horse's hoof from multiple shoe changes.

Accordingly, a need is identified for a more economical, versatile and efficient alternative to the one-piece horseshoe, which reduces the number of shoe changes that may occur between normal trimming and shoeing. Specifically, a need exists for a horseshoe that may be easily manipulated to change from a plain horseshoe to a horseshoe with a toe grab having different lengths, i.e., from flush to 8 millimeters and vice-versa without the need for re-shodding, such that a single horseshoe may be utilized during training and racing on different race surfaces and weather conditions. As a result, the time and expense of re-shodding a horse's shoes would be greatly reduced or eliminated altogether. Furthermore, a need exists for minimizing the risk of hoof-related injuries from multiple shoe changes.

SUMMARY

In accordance with one aspect of the disclosure, a substantially u-shaped horseshoe connected to a hoof of a horse adaptable for use on different surfaces without removing the horseshoe from the horse is provided. The horseshoe includes a cavity formed within a center of the closed portion of the substantially u-shaped horseshoe. The horseshoe further includes a removable insert having a toe grab configured to be positioned within the cavity.

In one embodiment, one of the cavity and the removable insert has a raised boss and the other one of the cavity and the removable insert has a recessed boss. The raised boss and the recessed boss mate to provide lateral strength perpendicular to the horse's weight in the same direction as gravity and to prevent the insert from sliding. The horseshoe may be made from aluminum, while the removable insert may be made from steel. The toe grab may be selected from one of a plurality of different heights.

Another aspect of the disclosure relates a horseshoe having a toe portion and a heel portion for connecting to a hoof of a horse adaptable for use on different surfaces without removing the horseshoe from the horse. The horseshoe has a plate including a recessed cavity in a center of the toe portion, wherein the recessed cavity has a center hole. The horseshoe further includes an interchangeable insert having a toe grab positioned on a top surface of the insert and a stud positioned on a bottom surface of the insert. The stud of the interchangeable insert is positioned within the center hole of the plate such that the bottom surface of the interchangeable insert is flush with a top surface of the recessed cavity. The horseshoe also includes a retaining clip for securing the stud within the center hole.

The horseshoe may have a slot positioned on one of an inner edge or outer edge of the toe portion for receiving the retaining clip. The retaining clip may have two arms for engaging the stud and an opening for removal of the retaining clip from the slot. The center hole of the recessed cavity may surrounded by a recessed cylindrical boss, while the stud of the interchangeable insert may be surrounded by a raised boss at a first end and a shoulder at an end opposite the first end. The retaining clip may engage the stud of the interchangeable insert above the shoulder. The recessed cavity may have two recessed linear bosses positioned on each side of the center hole, while the interchangeable insert has two raised linear bosses positioned on each side of the stud for mating with the two recessed linear bosses of the recessed cavity.

In yet another aspect of the disclosure, a horseshoe for thoroughbred horse racing having a toe portion and a heel portion for connecting to a hoof of a horse adaptable for use on different surfaces without removing the horseshoe from the horse is provided. The horseshoe includes a plate having a recessed cavity with an arcuate-shape groove along an outer edge of the horseshoe and tapered side edges extending from the arcuate-shape groove to an inner edge of the horseshoe. The horseshoe further includes an interchangeable insert having an arcuate-shaped toe grab positioned on a top surface of the insert configured to fit within the arcuate-shaped groove of the recessed cavity, said insert having opposite tapered side edges corresponding to the tapered side edges of the recessed cavity. Finally, the horseshoe includes a slot positioned in the inner edge of the horseshoe configured to receive a retaining clip for securing the interchangeable insert to the recessed cavity. The recessed cavity and interchangeable insert may have corresponding cut-out portions to assist in retrieval of the retaining clip. The horseshoe and interchangeable insert may be made from different materials.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the embodiments and like numerals represent like details in the various figures. Also, it is to be understood that other embodiments may be utilized and that process or other changes may be made without departing from the scope of the disclosure. The following detailed description is not to be taken in a limiting sense, and the scope of the invention is defined only by the appended claims and their equivalents. In accordance with the disclosure, a horseshoe having a removable insert is hereinafter described.

Figure 1:
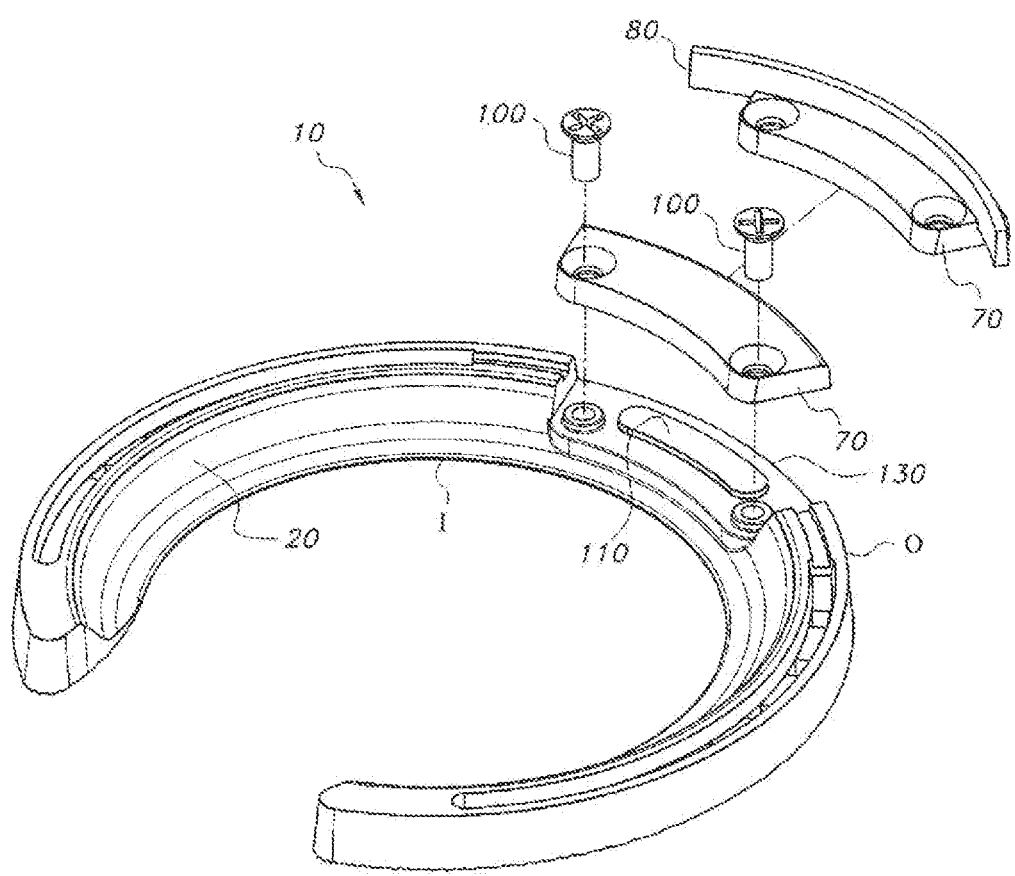
FIG. 1 is an exploded perspective view of a horseshoe with an insert forming one aspect of this disclosure.
Figure 2:
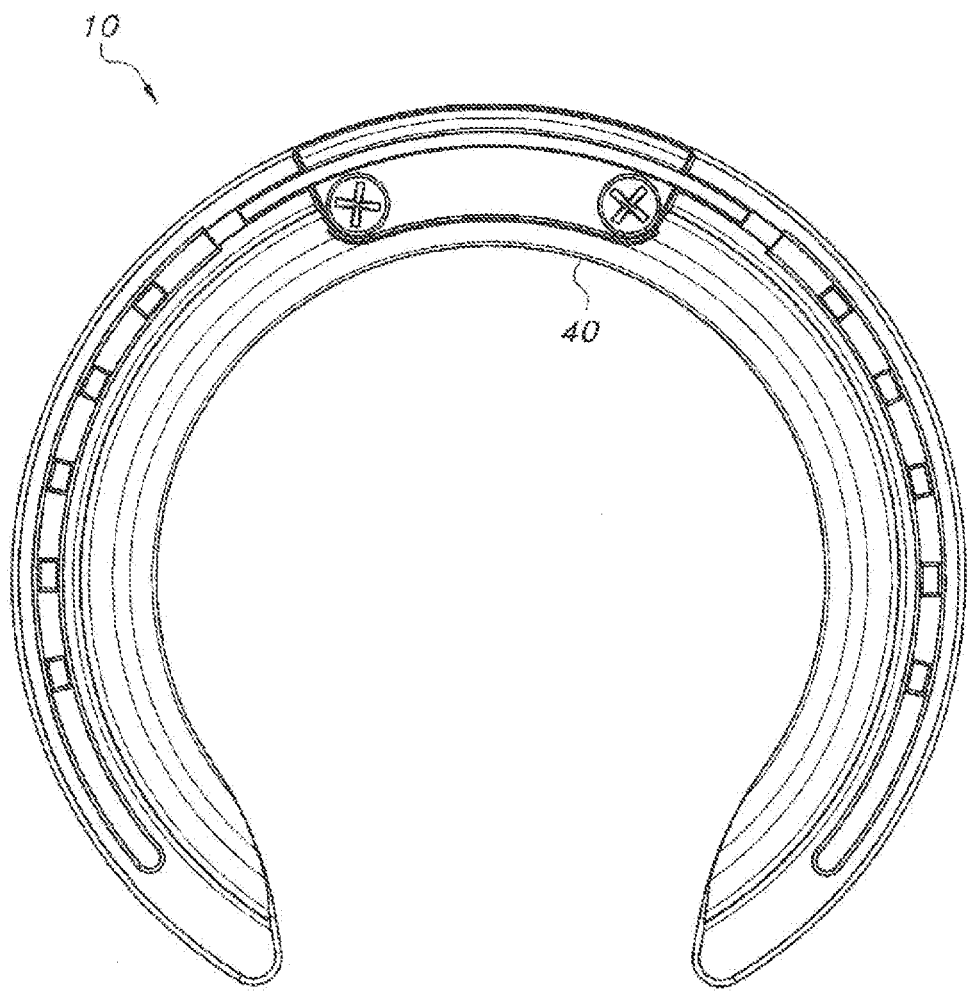
FIG. 2 is a top view of the bottom side of a horseshoe with an insert forming one aspect of this disclosure.
Figure 3:
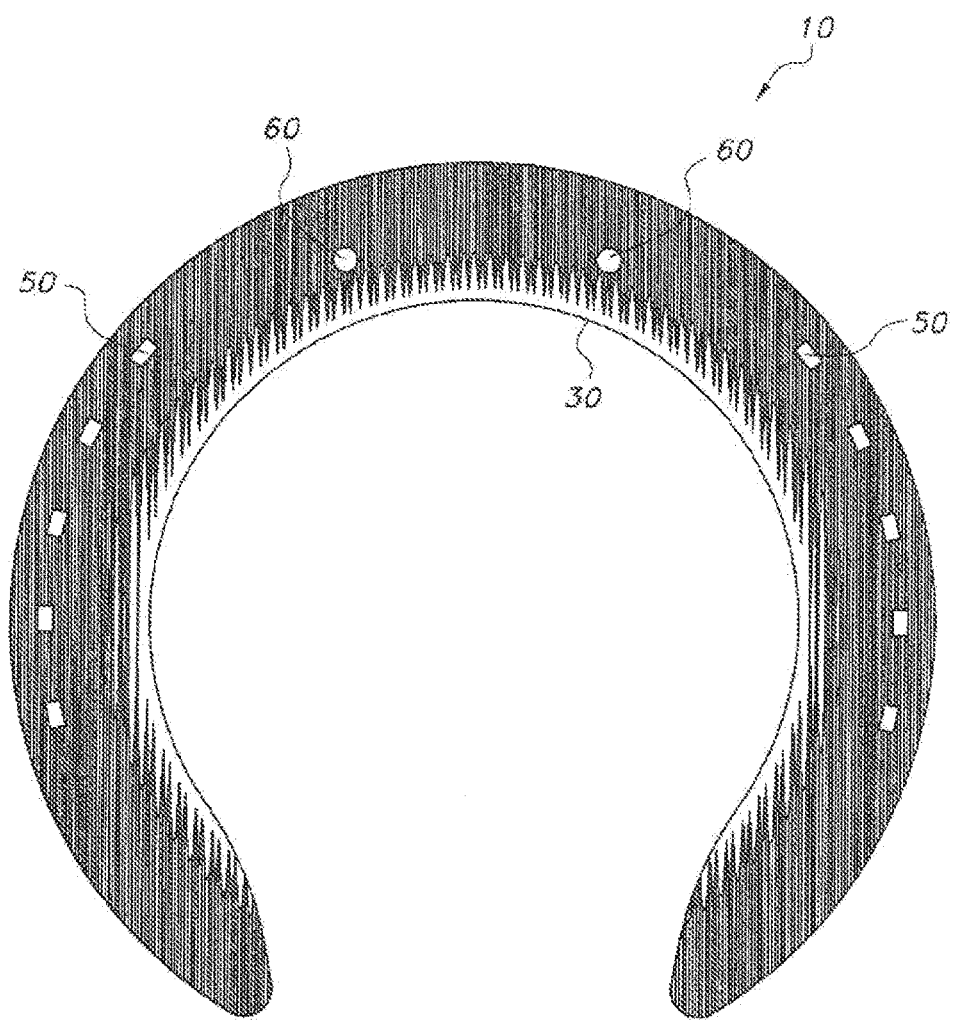
FIG. 3 is a top view of the top side of a horseshoe forming one aspect of this disclosure.
Figure 4:
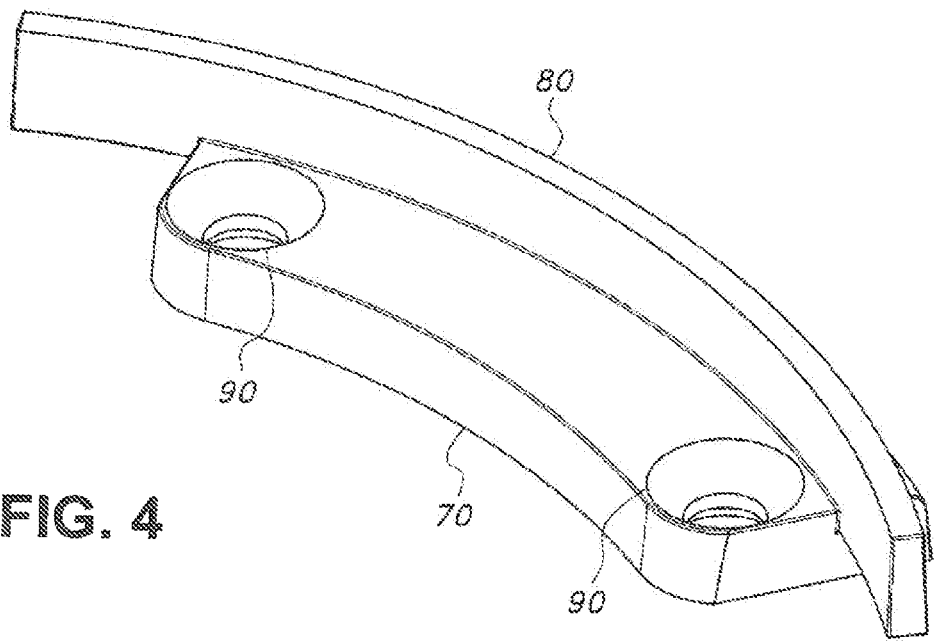
FIG. 4 is a perspective top view of an insert having a grab forming one aspect of this disclosure.

Reference is now made to FIG. 1, which is a perspective view illustrating one embodiment of a horseshoe 10 that may be used as both a front shoe and a rear shoe for a horse. The horseshoe 10 includes a master plate or base 20, which may be substantially U-shaped (the toe portion of the master plate 20 is the portion at the closed-end of the U opposite the open end of the U). The master plate 20 may be cast using a variety of materials, such as aluminum, steel, plastic, fiberglass, rubber or any other suitable material. The master plate 20 has a top surface 30 and a bottom surface 40. As shown in FIG. 2, the top surface 30 of the master plate is substantially flat for attaching directly to the horse's hoof. On the other hand, the bottom surface 40 (as shown in FIGS. 3 and 4) of the master plate 20 is the part of the horseshoe 10 that contacts the ground when the horse's hoof touches the ground. The exact shape, dimensions and specifications of the horseshoe may vary to fit the horse or owner's needs.

As shown in FIGS. 2 and 3, the master plate 20 has a plurality of openings 50 spaced along the entirety of the plate. The openings extend through the top and bottom surfaces for the farrier to attach the top surface of the horseshoe 10 directly to the horse's hoof, such as by using nails that are nailed through the openings 50. Aside from the toe portion discussed in more detail below, the master plate 20 is typically representative of a standard horseshoe. For example, the master plate 20 may be different sizes and styles for the various equine breeds, the particular activity for the horse and the horse's specific characteristics. Furthermore, the master plate 20 may have tapered ends at the open end of the U and a peripheral surface on the bottom surface 40 that slopes inward such that the inner edge (I) of the master plate is narrower than the outer edge (O) of the master plate.

As perhaps best seen in FIG. 1, a section of the toe portion on the bottom surface of the master plate is missing such that there is a recess or cavity 130 between the outer edges of the master plate 20. In the cavity 130, the master plate 20 has at least one opening on the bottom surface for inserting a fastening device, such as a screw. It should be appreciated that other types of fastening devices may be used. As discussed in more detail below, a retaining clip 200 may be used such that no screws, nails or other fasteners are required to be used in connecting the insert.

In the embodiment shown in FIG. 1, the master plate 20 has two openings 60 on the bottom surface 40 in the cavity. The openings may be threaded for increasing the thread engagement with the fastening device. In the cavity 130 of the bottom surface 40 of the master plate 20, a boss 110 is positioned above the at least one opening. In the embodiment shown, the boss 110 is raised and substantially oval shaped. However, it should be appreciated that the boss 110 may be recessed and may be in other geometrical shapes.

An insert 70 may be positioned in the recess on the bottom surface of the master plate 20 and may be substantially flush with the bottom surface 40 of the horseshoe 10. The insert 70 may be cast using the same or different material as the master plate, such as being made of aluminum, steel, plastic, fiberglass, rubber or any other suitable material. As shown in FIG. 1, the insert 70 may or may not have a toe grab 80. The toe grab 80 may be cast as part of the insert 70 such that it cannot be removed without damaging the insert from its intended use. As a result, there are typically at least two different inserts that may be removably inserted into the master plate 20 depending on whether a toe grab is desired, i.e., one insert having a toe grab (see FIGS. 4 and 5) and another insert without a toe grab (see FIGS. 6 and 7). The specific variations of the insert 70 including the geometry and angle of the insert may vary.

Figure 5:
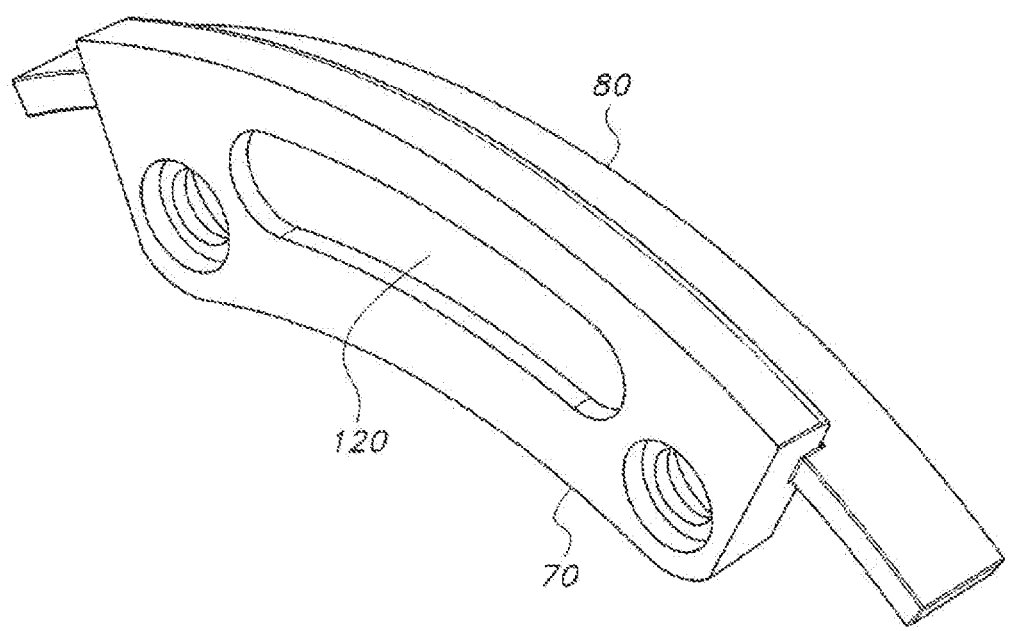
FIG. 5 is a perspective bottom view of the insert having a grab forming one aspect of this disclosure.
Figure 6:
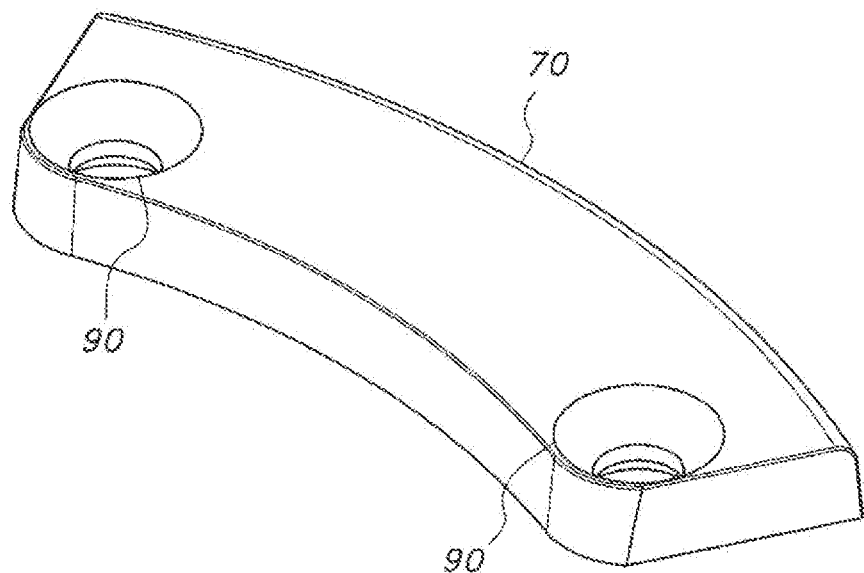
FIG. 6 is a perspective top view of an insert without a grab forming one aspect of this disclosure.

The toe grab 80 may be a substantially continuous element that extends along the groove in the top surface of the insert. The height of the toe grab 80 may vary depending on a number of factors, such as a taller grab for greater traction in wet conditions while a shorter grab may be desired under drier conditions. In any event, the toe grab 80 typically extends vertically higher than the outer edge of the master plate 20. The length of the toe grab 80 may also vary. As shown in FIGS. 4 and 5, the toe grab 80 may extend greater than the length of insert 70. In other embodiments not shown, the toe grab 80 may be shorter than the length of the insert 70. In addition to variations in the height and length of the toe grab, the angle of the toe grab may also vary.

The insert 70 has at least one opening for aligning with the opening 60 in the master plate 20, such that a fastener may be inserted through the opening in the insert and the opening in the master plate to removably connect the insert 70 to the master plate 20. As shown in FIGS. 4-7, the insert has two openings 90 corresponding equally to the number of openings 60 in the master plate 20. Similar to the openings in the master plate 20, the openings 90 in the insert 70 may be threaded to increase the thread engagement with the fastening devices. A pair of fastening devices 100, such as screws (as shown in FIG. 1) may be used to removably secure the insert 70 to the master plate 20. Of course, it should be appreciated that other types of fasteners as well as an adhesive may be used to secure the insert 70 to the master plate 20. Again, it should be appreciated that a retaining clip 200 may be used such that no screws, nails or other fasteners are required, which eliminates the need for additional small parts that may be easily lost and add complexity and time to the shoeing process.

The top surface of the insert 70 is shaped and styled substantially the same as the master plate 20, such that it fits within the recess of the master plate 20. Furthermore, the insert 70 is positioned within the recess of the master plate 20 such that it substantially flush with the bottom surface 30 of the master plate 20 and no gap exists. In the embodiment shown in FIG. 1, the insert 70 has two spaced openings 90 at the lower end, which extend through the top and bottom surface of the insert 70. The spaced openings 90 are adjacent the inner edge (I) of the horseshoe when the insert 70 is positioned in the master plate 20. The top surface of the insert 70 has a continuous groove co-planar with the apertures but closer to the outer edge (O) of the horseshoe 10. When the insert 70 is properly positioned within the recess of the master plate 20, the continuous groove aligns with a groove in the master plate 20 near the outer edge of the horseshoe 10.

Figure 7:
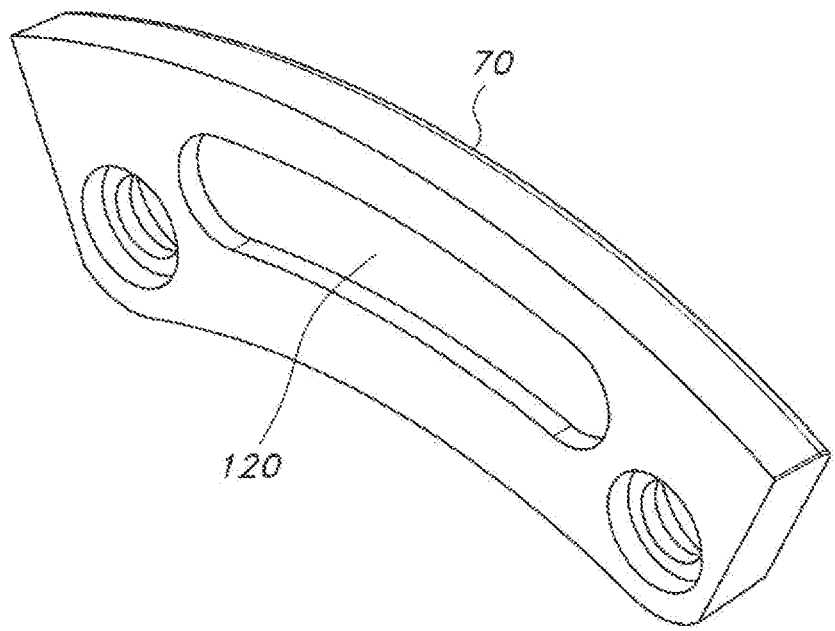
FIG. 7 is a perspective bottom view of the insert without a grab forming one aspect of this disclosure.
Figure 8:
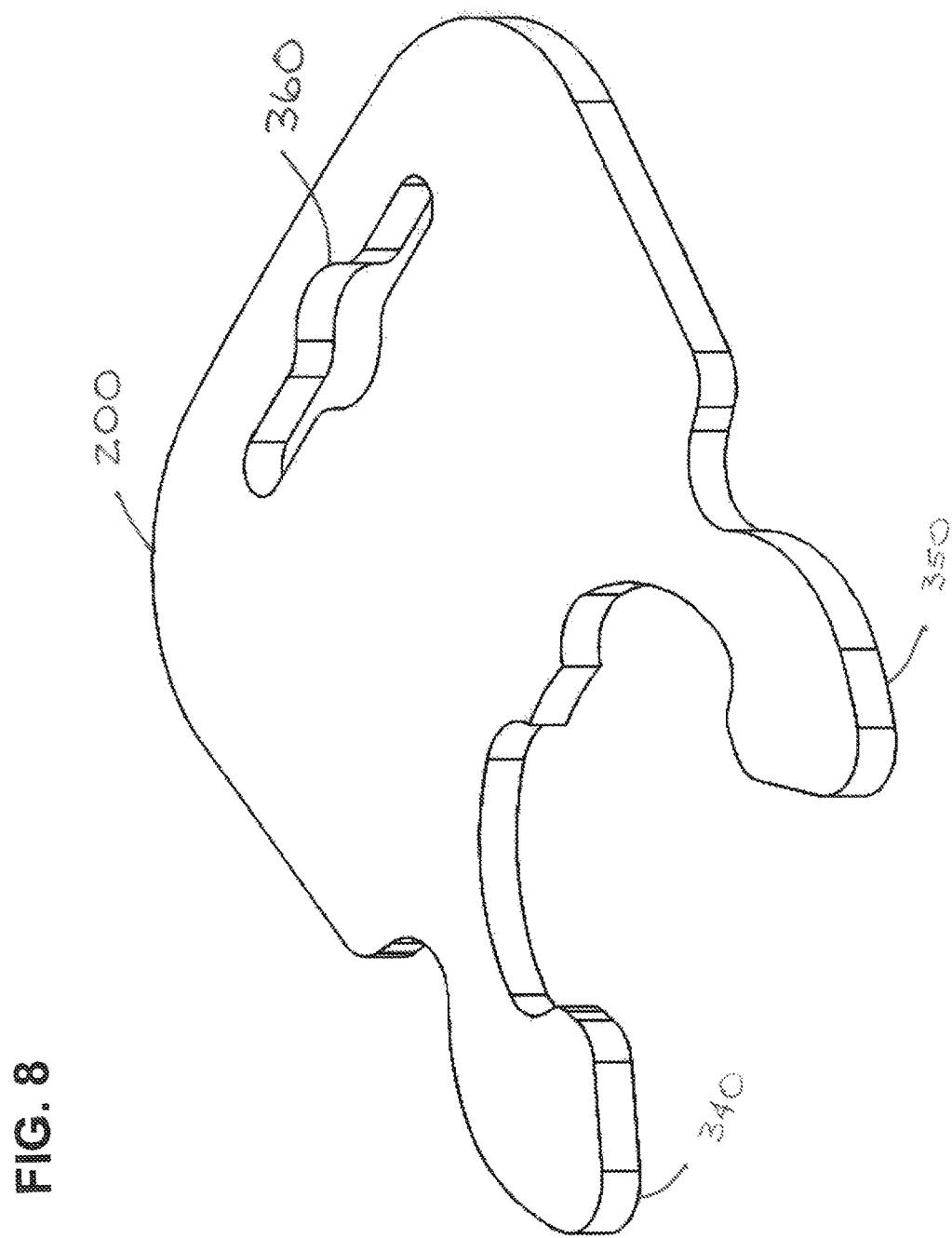
FIG. 8 is a perspective top view of a retaining clip that may be used to removably secure the insert to the horseshoe forming one aspect of this disclosure.

As shown in FIGS. 5 and 7, the bottom surface of the insert 70 is substantially flat so it fits snugly within the recess in the master plate 20 with the exception of a boss 120. In the embodiment shown, the boss 120 is recessed, i.e., the recessed boss 120 in the insert mates with the raised boss 110 in the master plate 20 to provide lateral strength perpendicular to the horse's weight in the same direction as gravity. The bosses 110, 120 prevent the insert 70 from sliding with a failure mode of sheer against the fastener(s) holding the insert 70 and the master plate 20 together. Specifically, the bosses along with the threaded openings accommodate sheering forces generated by the horse's foot on the horseshoe/insert interface as a result of sliding, i.e., a hard stop by the horse. As noted above, if the boss 110 in the master plate is recessed, the boss 120 of the insert may be raised, such that bosses 110/120 mate together. Again, the bosses may be of any geometrical shape.

Figure 9A:
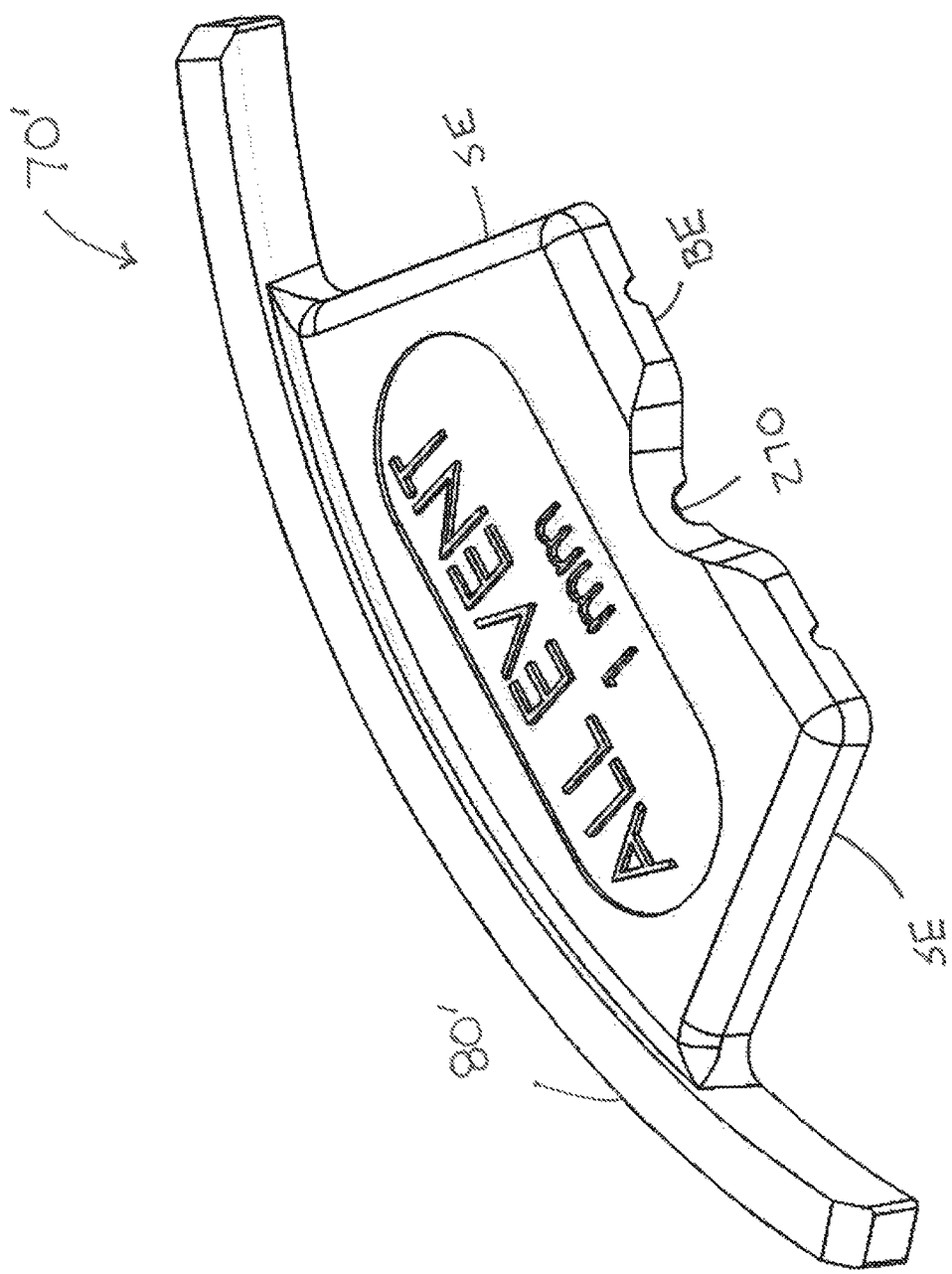
FIGS. 9a-9c are a front perspective view, a top perspective view and a front view, respectively, of an alternate embodiment of an insert having a toe grab forming one aspect of this disclosure.
Figure 9B:
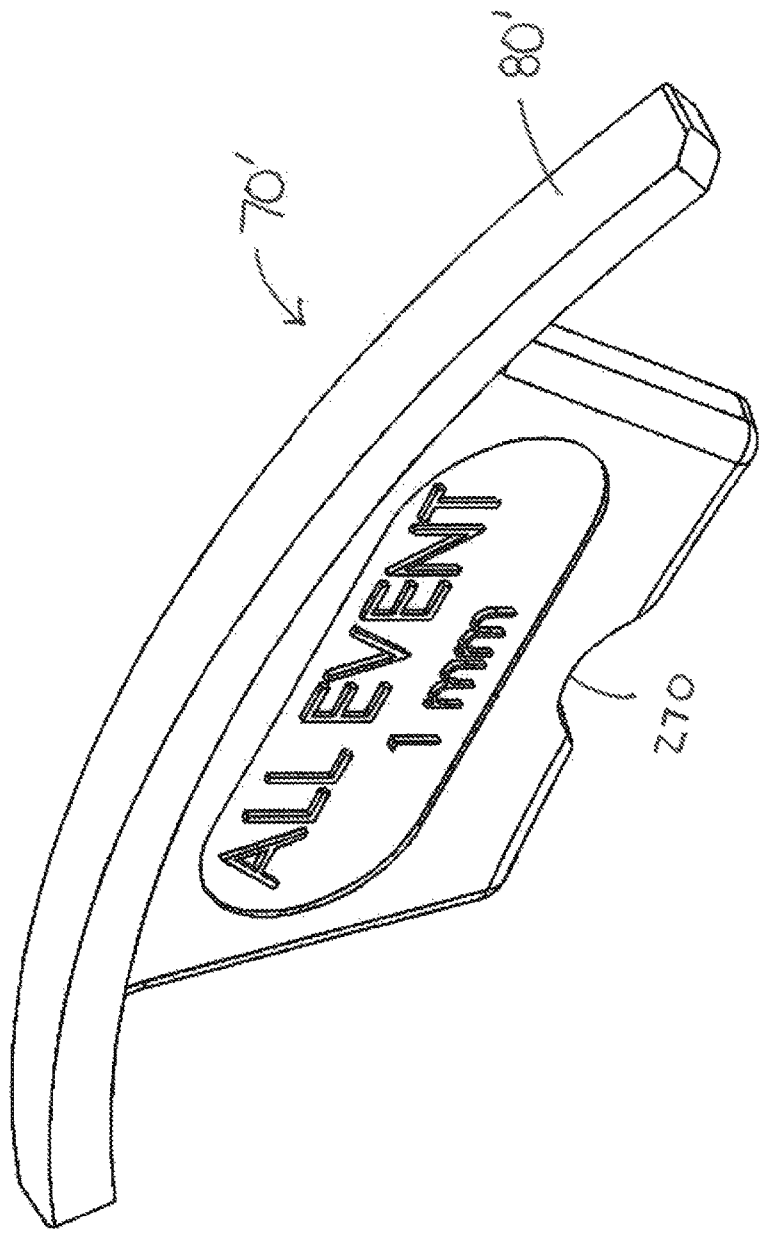
Figure 9C:
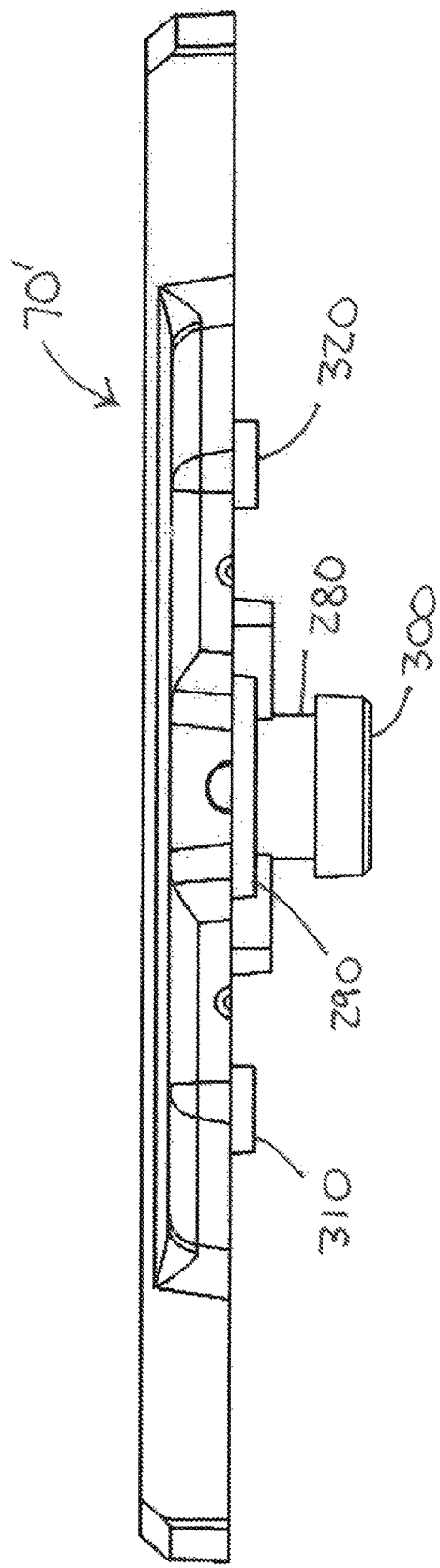
Figure 10:
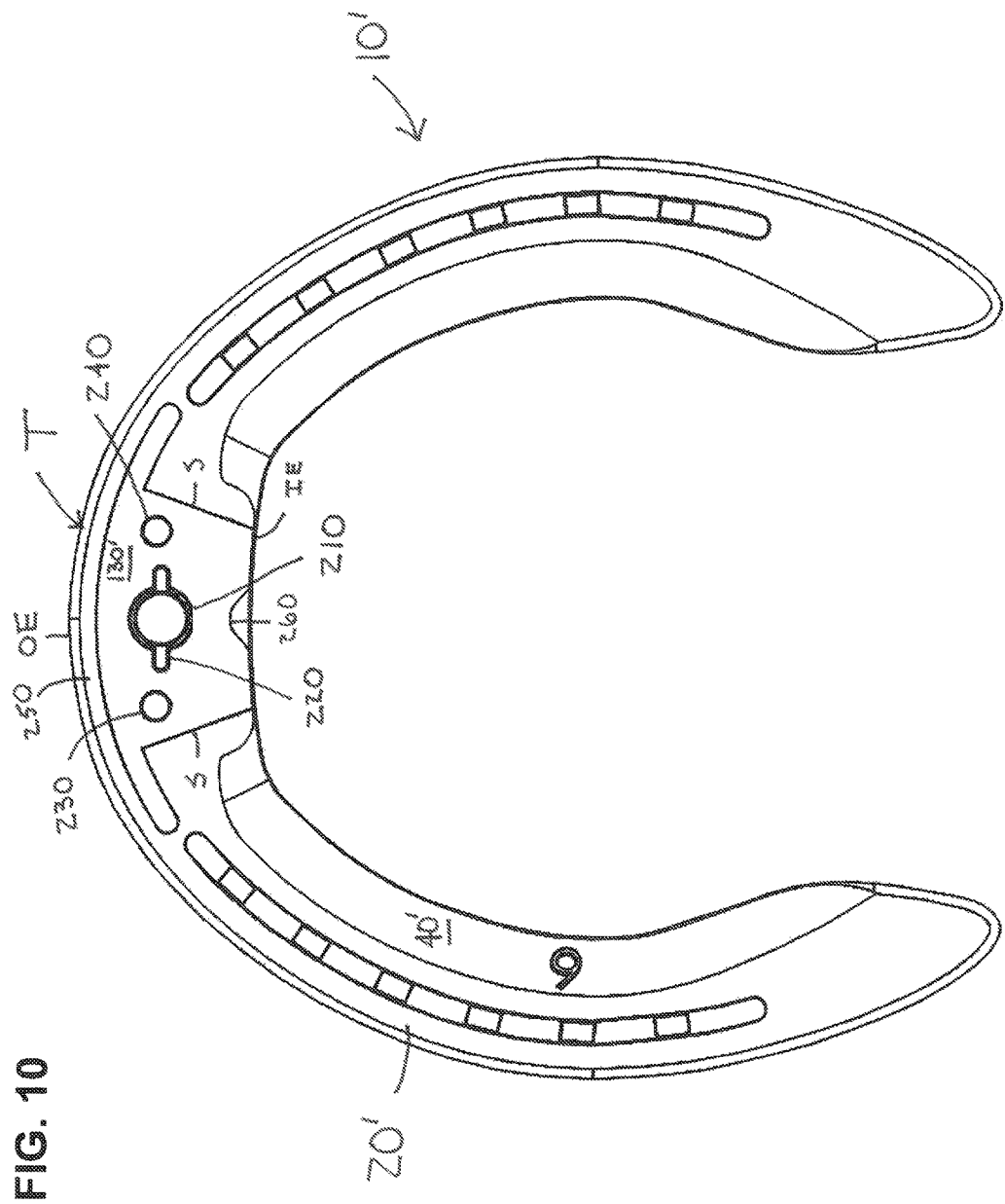
FIG. 10 is a top view of the alternate embodiment of the horseshoe without the insert positioned within the recess forming one aspect of this disclosure.
Figure 11A:
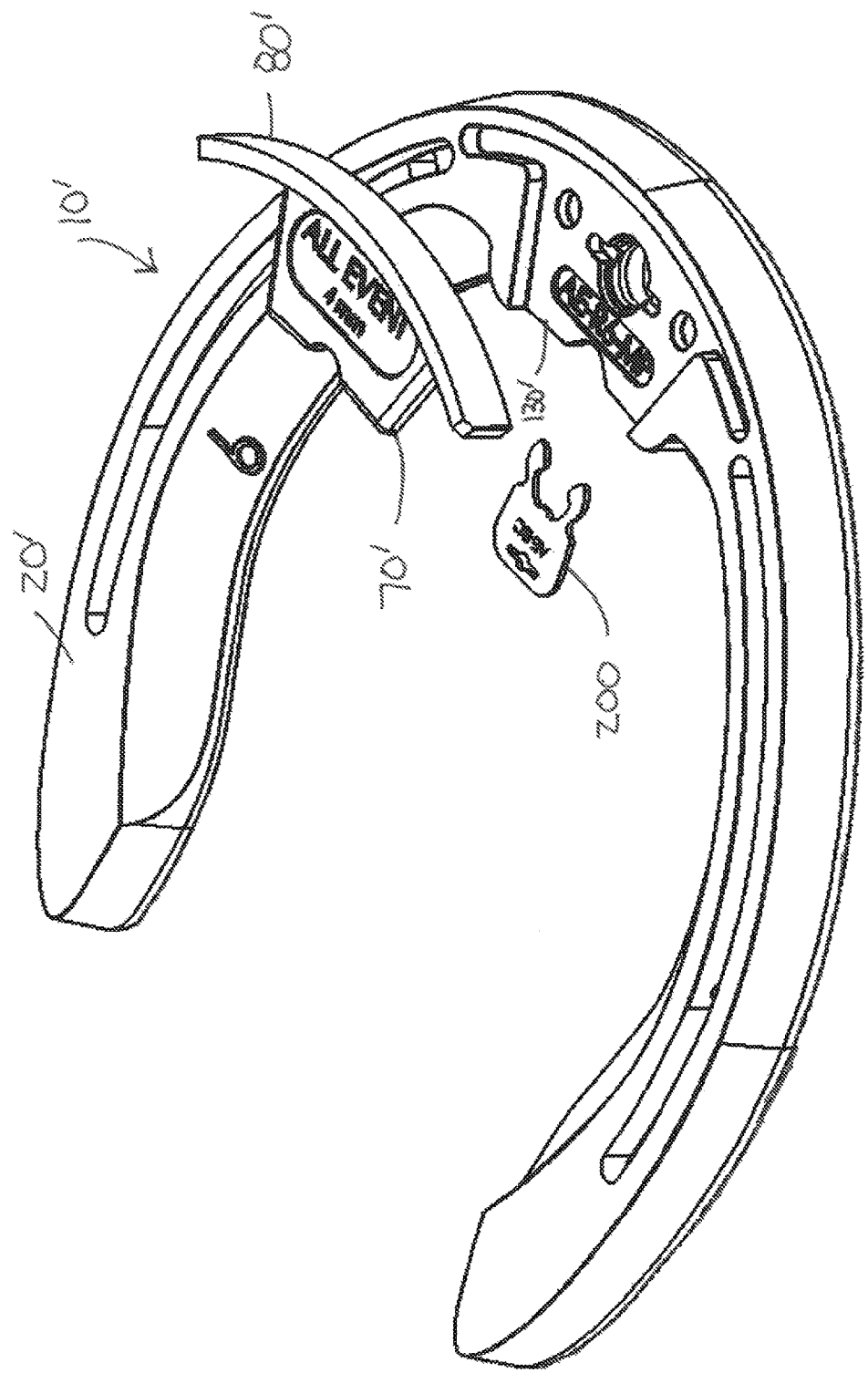
FIGS. 11a and 11b are a top perspective expanded view and a bottom perspective expanded view of the alternate embodiment of the horseshoe and the insert forming one aspect of this disclosure.
Figure 11B:
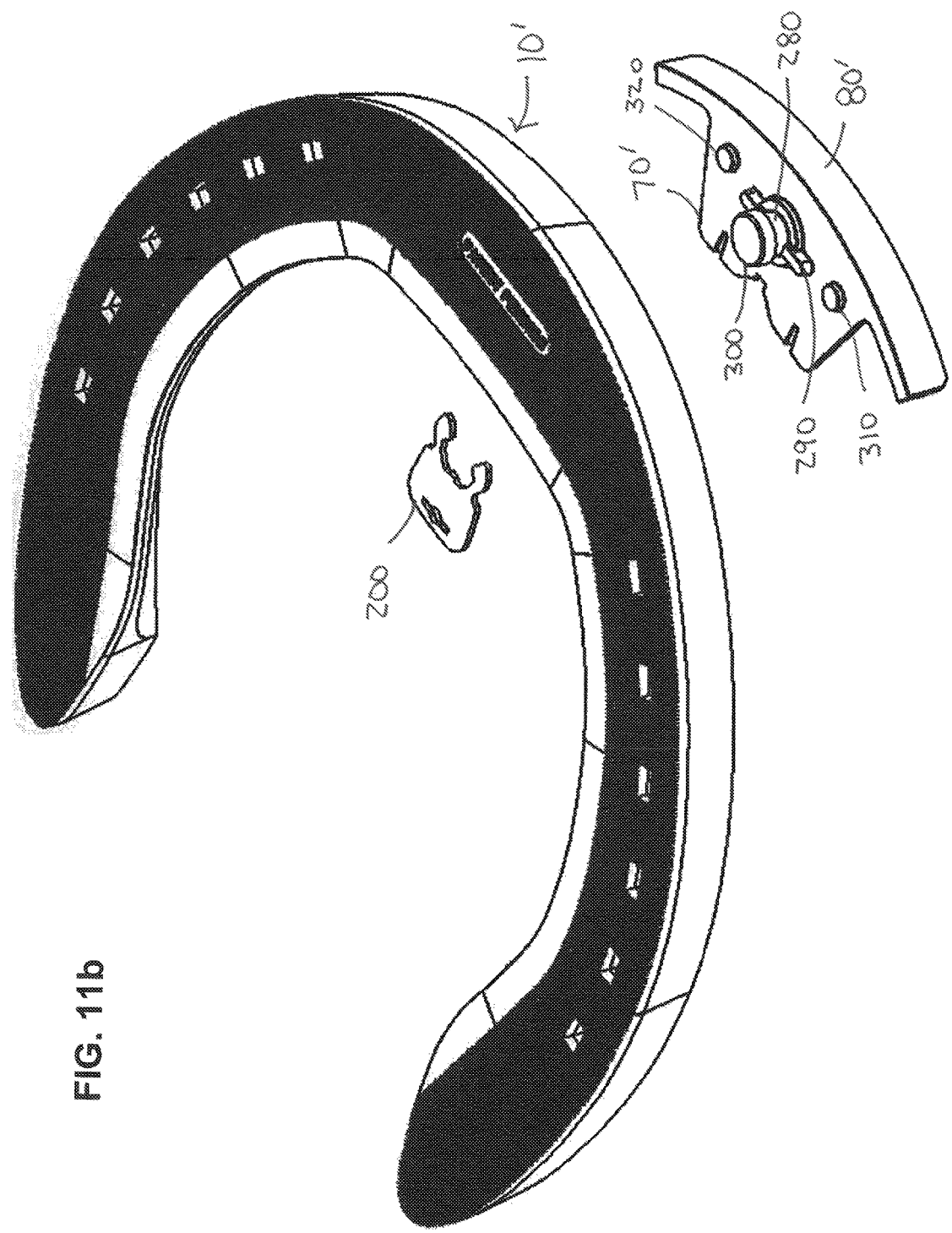

In another embodiment shown in FIGS. 8-12, a retaining clip 200 (perhaps best shown in FIG. 8) is used to removably secure the insert 70' to the master plate or base 20' of the horseshoe 10' such that no screws or other fasteners are required. With reference to FIGS. 10 and 11, a cylindrical cavity or recess 130' is formed in the center of a bottom surface 40' of the toe portion (T) of the base 20'. The cavity 130' includes a center hole 210 feature surrounded by a recessed cylindrical boss 220. In addition, a pair of recessed linear bosses 230, 240 may be located on the centerline of the cylindrical cavity 130' about one hundred eighty degrees (180°) apart. In the embodiment shown, the first recessed linear boss 230 is located at approximately 3:00, while the second recessed linear boss 240 is located at 9:00. However, it should be appreciated that the pair of recessed linear bosses may be at different positions, but are typically positioned about 180° apart.

The recessed cylindrical boss 220 extends deeper into the base of the horseshoe than the depth of the optional pair of recessed linear bosses 230, 240. Near the outer edge (OE) of the toe portion of the base, the cylindrical cavity matches the rounded shape of the outer edge of the base such that an arcuate groove 250 is formed along with outer edge and then each side (S) extending down from the groove tapers down towards the inner edge (IE) of the base. In other words, the cavity has a rounded T-shape with tapered edges extended downward. The cavity further has a substantially u-shaped cutout 260 on the inner edge of the base.

Turning to FIGS. 9a-9c, the removable or interchangeable insert 70' has a toe grab 80' connected thereto. The insert 70' may be removably mounted to the master plate or base 20' of the horseshoe. The toe grab may be variable in height, such as level or flush with the bottom or ground surface of the horseshoe or base, 1 millimeter, 2 millimeters, 4 millimeters or 8 millimeters in height. Of course, it should be appreciated that other heights of the toe grab are contemplated. As such, the insert may easily be removable from the base such that different height toe grabs permanently mounted to separate inserts may be used depending on the racing surface, weather condition or preference of the horse, trainer or owner. Advantageously, instead of requiring a complete re-shodding of the horse based upon various factors, including a change in weather, a farrier may have a number of inserts having different height toe grabs permanently mounted thereon such that one insert may be replaced or substituted with another without replacing the entire horseshoe.

The shape of the insert 70' substantially matches the shape of the cavity 130' of the base 20'. Specifically, the toe grab 80' permanently mounted to the insert (which corresponds to the outer top edge of the insert) matches the rounded shape of the outer edge of the cavity such that the toe grab is positioned and snugly fits within the rounded top portion of the "T." The sides edges (SE) of the insert 70' taper down such that the sides of the insert fit firmly or flush within the cavity. The bottom edge (BE) of the insert has a substantially u-shaped cutout 270 corresponding to the u-shaped cutout 260 of the cavity and, therefore, matching the shape of the inner edge of the base.

As shown in FIG. 9c, the bottom surface of the insert 70', i.e., the surface contacting the top surface of the cavity of the base has a center stud 280 surrounded by a raised boss 290 at a proximal end corresponding to the recessed cylindrical boss of the cavity. The center stud is positioned within the recessed cylindrical boss 220 of the cavity 130'. The distal end of the center stud 280 has a shoulder feature or element 300 for maintaining the insert within the cavity. Furthermore, the bottom surface of the insert has two optional raised linear bosses 310, 320, which correspond to and mate with the pair of recessed linear bosses of the cavity 230, 240 in order to provide a better fit between the insert and the cavity.

Figure 12:
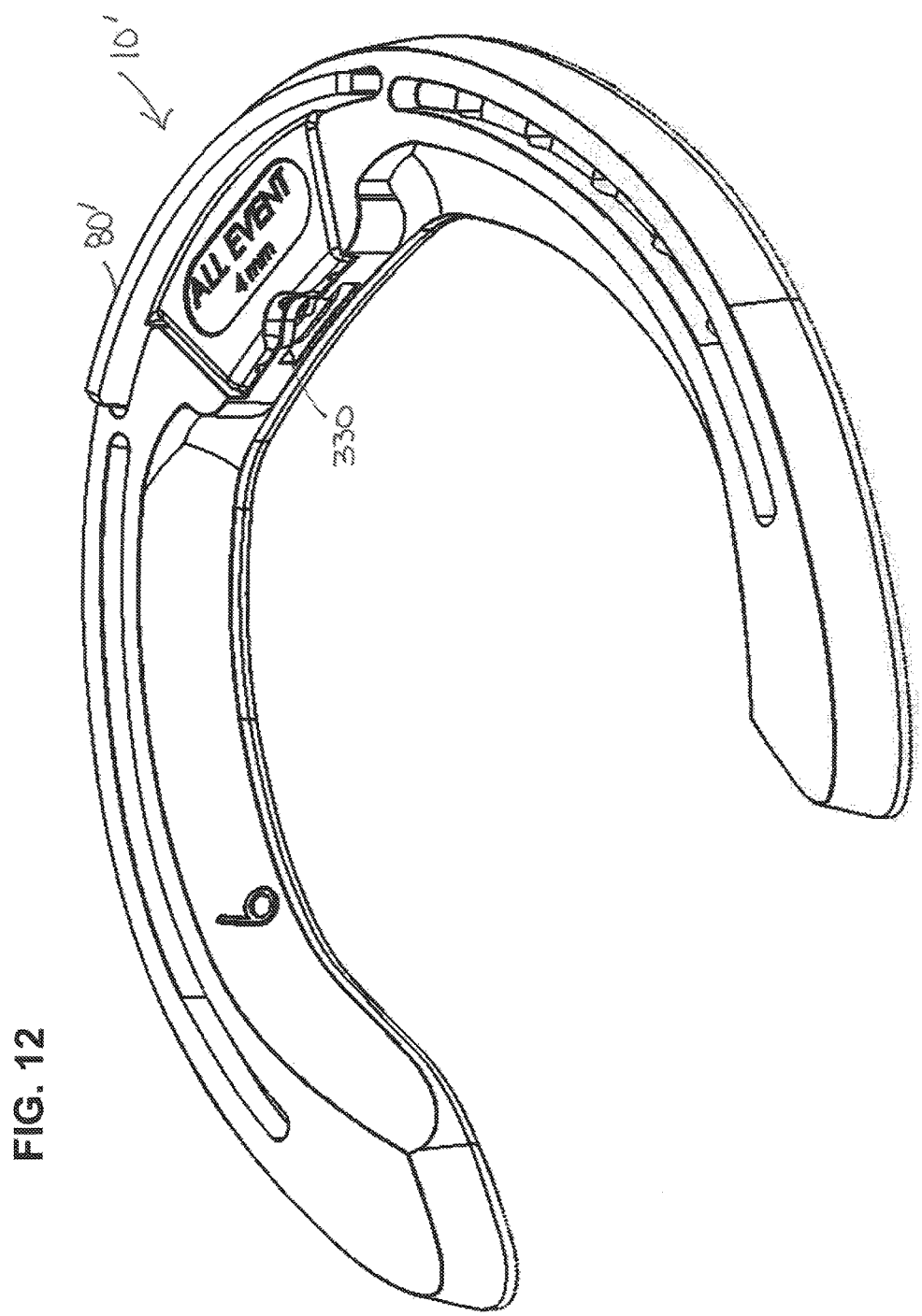
FIG. 12 is a top perspective view of the alternate embodiment of the horseshoe with the insert positioned within the recess forming one aspect of this disclosure.

As shown in FIG. 12, the base 20' of the horseshoe 10' has a slot 330 located at an inside edge, i.e., the inner portion of the U-shaped portion of the horseshoe in the center of the toe portion. It should be appreciated that the slot 330 may alternatively located at an outer edge, i.e., the outside portion of the U-shaped portion of the horseshoe in the center of the toe portion. The slot 330 receives the retaining clip 200 which is inserted into the slot for engaging the center stud 280 of the insert above the shoulder feature 300. Specifically, the center stud 280 of the insert extends through the center hole 210 of the cavity such that when the retaining clip 200 is slid into the slot 330 of the base 20', it may be retained by the retaining clip.

In more detail, the retaining clip 200 is substantially rectangular-shaped with two arms 340, 350 for engaging or snapping onto or around the center stud 280. The retaining clip 200 further has an opening 360 positioned near an end opposite the arms. The retaining clip 200 removably locks the insert within the cavity. When it is desired to change or remove the insert, a tool, such as a pen or the like (not shown) may be used to unfasten the retaining clip 200 by engaging the opening and remove the retaining clip from the slot. Once the retaining clip 200 is removed, the insert may be easily removed from the recess. It should be appreciated that the cutout portions of the cavity and the insert aid in removal of the retaining clip 200 from the slot.

In use, the insert 70 or 70' allows the user to change the type of insert used with the horseshoe 10 when necessary without changing the entire horseshoe 10, which is advantageous for the reasons discussed above. Namely, the use of an insert greatly reduces the time, labor and expense of adding and removing the entire horseshoe from the horse's hoof when a toe grab is desired. For example, if the track conditions on the day of a thoroughbred horse race become wet, the insert without a toe grab may be easily replaced by an insert having a toe grab by inserting the insert with the toe grab into the horseshoe 10 to improve the horse's traction with the wet surface of the track. As a result, the horseshoe with the removable insert 70 is adaptable for use on all racing surfaces and track conditions.

Importantly, knowledgeable personnel such as skilled horsemen may be able to quickly perform the change once the master plate 20 has already been applied by a farrier, which alleviates the need for a farrier to replace the entire shoe, which saves time and money. Specifically, if a toe grab 80 of a desired height is needed, a skilled horseman may simply use a screwdriver or other similar tool to remove the insert 70 without a toe grab 80 or an insert having a toe grab that is flush with the bottom surface of the master plate from the master plate 20 by removing the fasteners 100, such as by unscrewing the screws. In the alternate embodiment illustrated in FIGS. 8-12, the insert may be removed by simply removing the retaining clip. The insert 70 without a toe grab may then be removed from the master plate 20 and replaced with one of a plurality of inserts 70 having a toe grab 80 of a particular height. Once the insert 70 having a toe grab 80 is positioned in the master plate 20, the fasteners may be placed through the openings and apertures and tightened to secure the insert with the toe grab to the horseshoe. Advantageously, the insert is available in various configurations and materials and is adaptable to all equine related industries.

The foregoing descriptions of various embodiments are provided for purposes of illustration, and are not intended to be exhaustive or limiting. Modifications or variations are also possible in light of the above teachings. The embodiments described above were chosen to provide the best application to thereby enable one of ordinary skill in the art to utilize the disclosed inventions in various embodiments and with various modifications as are suited to the particular use contemplated. All such modifications and variations are within the scope of the invention.

The invention claimed is:

1. A substantially u-shaped horseshoe connected to a hoof of a horse adaptable for use on different surfaces without removing the horseshoe from the horse, comprising:
   a cavity formed within a center of a bottom side of the closed portion of the substantially u-shaped horseshoe, said closed portion including an inner edge having a surface perpendicular to the bottom side;
   a slot located in the inner edge of the closed portion of the substantially u-shaped horseshoe;
   a removable insert configured to be positioned within the cavity, said removable insert having a toe grab positioned on a top surface and a stud positioned on a bottom surface; and
   a retaining clip having two arms adapted to engage the stud, said retaining clip adapted to be inserted into the slot to lock the removable insert within the cavity such that no additional fasteners are required.

2. The horseshoe according to claim 1, wherein one of the cavity and the removable insert has a raised boss.

3. The horseshoe according to claim 2, wherein the other one of the cavity and the removable insert has a recessed boss.

4. The horseshoe according to claim 3, wherein the raised boss and the recessed boss mate to provide lateral strength perpendicular to the horse's weight in the same direction as gravity and to prevent the insert from sliding.

5. The horseshoe according to claim 1, wherein the horseshoe is made from aluminum.

6. The horseshoe according to claim 5, wherein the removable insert is made from steel.

7. The horseshoe according to claim 1, wherein the toe grab is selected from one of a plurality of different heights.

8. A horseshoe having a toe portion and a heel portion for connecting to a hoof of a horse adaptable for use on different surfaces without removing the horseshoe from the horse, comprising:
- a plate having a recessed cavity in a center of the toe portion, said recessed cavity having a center hole;
- an interchangeable insert having a toe grab positioned on a top surface of the insert and a stud positioned on a bottom surface of the insert, wherein the stud of the interchangeable insert is positioned within the center hole of the plate such that the bottom surface of the interchangeable insert is flush with a top surface of the recessed cavity; and
- a retaining clip having two arms adapted to engage the stud and secure the stud within the center hole such that no additional fasteners are required.

9. A horseshoe according to claim 8, further comprising a slot positioned on one of an inner edge or outer edge of the toe portion for receiving the retaining clip.

10. A horseshoe according to claim 9, wherein the retaining clip has an opening for removal of the retaining clip from the slot.

11. A horseshoe according to claim 8, wherein the center hole of the recessed cavity is surrounded by a recessed cylindrical boss.

12. A horseshoe according to claim 11, wherein the stud of the interchangeable insert is surrounded by a raised boss at a first end.

13. A horseshoe according to claim 12, wherein the stud of the interchangeable insert has a shoulder at an end opposite the first end.

14. A horseshoe according to claim 13, wherein the retaining clip engages the stud of the interchangeable insert above the shoulder.

15. A horseshoe according to claim 14, wherein the recessed cavity has two recessed linear bosses positioned on each side of the center hole.

16. A horseshoe according to claim 15, wherein the interchangeable insert has two raised linear bosses positioned on each side of the stud for mating with the two recessed linear bosses of the recessed cavity.

17. A horseshoe for thoroughbred horse racing having a toe portion and a heel portion for connecting to a hoof of a horse adaptable for use on different surfaces without removing the horseshoe from the horse, comprising:
- a plate having a recessed cavity on a bottom side of the plate and an inner edge having a surface perpendicular to the bottom side with an arcuate-shape groove along an outer edge of the horseshoe and tapered side edges extending from the arcuate-shape groove to the inner edge of the horseshoe;
- an interchangeable insert having an arcuate-shaped toe grab positioned on a top surface of the insert and a stud positioned on a bottom surface of the insert configured to fit within the arcuate-shape groove of the recessed cavity, said insert having opposite tapered side edges corresponding to the tapered side edges of the recessed cavity;
- a slot positioned in the inner edge of the horseshoe; and
- a retaining clip having two arms adapted to engage the stud, said retaining clip received within the slot to secure the interchangeable insert to the recessed cavity such that no additional fasteners are required.

18. The horseshoe according to claim 17, wherein the recessed cavity and the interchangeable insert have corresponding cut-out portions to assist in retrieval of the retaining clip.

19. The horseshoe according to claim 17, wherein the horseshoe and the interchangeable insert are made from different materials.

* * * * *